United States Patent
Barbier

[15] 3,658,206
[45] Apr. 25, 1972

[54] BRAZED RUPTURE DISK ASSEMBLY

[72] Inventor: Jean Y. Barbier, Richmond Heights, Mo.
[73] Assignee: Intertherm, Inc., Saint Louis, Mo.
[22] Filed: June 8, 1970
[21] Appl. No.: 44,251

[52] U.S. Cl. ........................................................220/89 A
[51] Int. Cl. .........................................65d 25/00, 65d 47/36
[58] Field of Search.................................220/89 A, 27, 47

[56] References Cited

UNITED STATES PATENTS

| | | | |
|---|---|---|---|
| 3,195,769 | 7/1965 | Miller | 220/89 A |
| 2,663,458 | 12/1953 | MacGlashan, Jr. | 220/89 A |
| 2,856,096 | 10/1958 | Philip | 220/89 A |
| 3,484,817 | 12/1969 | Wood | 220/89 A |

Primary Examiner—Raphael H. Schwartz
Attorney—Jerome A. Gross

[57] ABSTRACT

A scored rupture disk is permanently installed in a fluid system, such as a hydronic baseboard heater designed for operation at an elevated pressure, to rupture at a predicted pressure increment. The scored central portion of the disk is left substantially flat; but rounds at normally working pressure, to work harden the metal at the score lines. When the pressure is raised, the material at the score lines ruptures at a precise pressure increment.

5 Claims, 3 Drawing Figures

PATENTED APR 25 1972 3,658,206
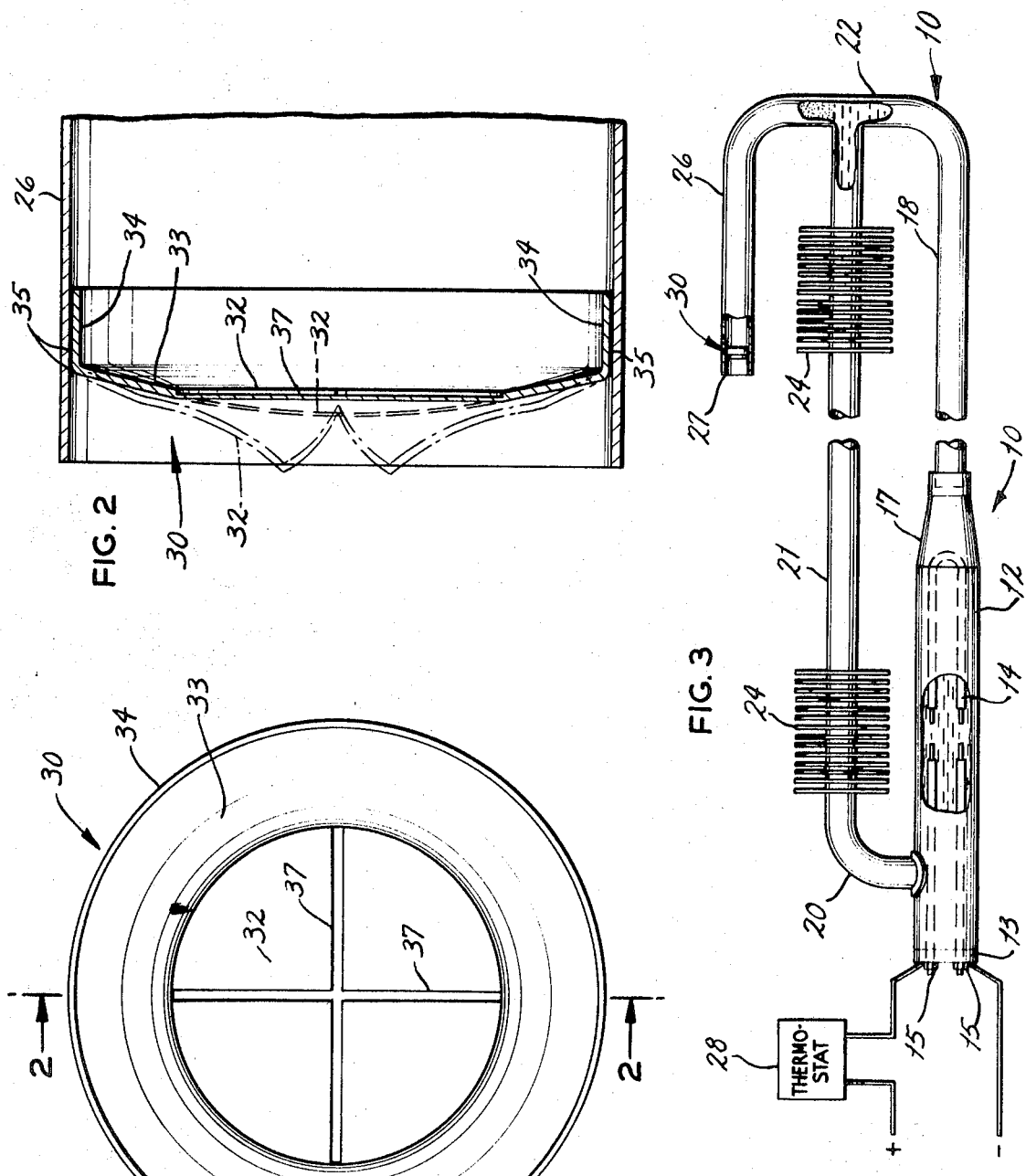

BRAZED RUPTURE DISK ASSEMBLY

BACKGROUND OF THE INVENTION

This invention relates to pressure relief devices formed of metal and cross-scored at their center. Domed rupture disks of this sort, such as shown in U.S. Pat. Nos. 3,109,553 to Fike and 3,005,573 to Dawson, are conventionally made as separate replaceable parts, to be clamped sealedly in place by their outer edges.

In certain types of fluid systems, such as sealed electrically powered hydronic baseboard heaters, thermostatic controls are successfully employed to prevent the build-up of pressure attendant to overheating; and it is extremely unlikely that there should be any malfunction not controlled by such thermostatic system or other pressure unloading system. Nevertheless, for purpose of meeting safety requirements, it may be desired to install such a rupture disk. As will be obvious, a permanently installed rupture disk is to be preferred in this situation, because permanent installation, as by brazing, avoids the danger of leakage, which may be present with a replaceable disk, as well as the expense of making the parts removable and replaceable.

The rupture disks shown in the two U.S. patents mentioned are preformed to a rounded dome-like configuration, with crossing thinned score lines. One reason why these devices work satisfactorily is that by die-forming such domed rupture disks, the material so rounded, and particularly the material at the score lines, is work hardened; and a predictable increment of pressure will fracture material made relatively brittle by work hardening.

However, if a rupture disk is to be permanently installed by brazing or other heat joining process, the metal, work hardened when the disk is rounded and scored, will be annealed; and after brazing will no longer fracture reliably at a predetermined pressure increment.

SUMMARY OF THE INVENTION

The principal purpose of the present invention is to provide a rupture disk permanently installed by brazing or other heat joining process within a fluid system which operates at a normal working pressure, wherein the disk will reliably rupture at a predicted increment over the normal working pressure. A further purpose is to provide a rupture disk so designed as to overcome the annealing effects of joining by brazing. A still further purpose is to utilize the rounding effect of the normal working pressure within the system on a previously flat rupture disk, to offset the effect of annealing and provide work hardening at its score lines.

These purposes are accomplished in the present invention by providing, installed in such a fluid system, a member dieformed of ductile heat-conductive sheet metal, preferably copper, with a substantially flat central portion and an annular portion surrounding it; the annular portion preferably being initially rounded to the contour which would be imposed on it by the normal working pressure of the system. The flanged outer edge of the surrounding annular portion is brazed within a tubular part of the fluid system. Score lines intersect at the center of the substantially flat portion. These are formed to a thickness of normally about one-fourth that of the thickness of the ductile sheet metal.

When the system is started up and achieves normal working pressure, the original flat circular central portion will be bulged outward to roundness. This extends the metal, particularly that at the score lines. Thus, although the entire disk has been annealed during the brazing operation, bulging its central portion to roundness appears to work harden the material at the score lines. A further increment in pressure, which in annealed copper would simply cause a ductile extension, will rupture the material at the score lines.

BRIEF DESCRIPTION OF THE DRAWINGS

FIG. 1 is an enlarged end elevation of a rupture disk embodying the present invention.

FIG. 2 is a sectional view, as seen along line 2—2 of FIG. 1, of such a rupture disk installed, as by brazing, at the end of the expansion tube of a conventional hydronic electric baseboard heater. The rounded configuration of the disk center after being subjected to working pressure is shown in dashed lines; the effect of rupture is shown in phantom lines.

FIG. 3 is a somewhat schematic view of a conventional hydronic baseboard heater, with the rupture disk of FIGS. 1 and 2 therein installed.

DESCRIPTION OF THE PREFERRED EMBODIMENT

While the present invention is suitable for installation in many types of fluid systems designed for operation at a normal working pressure greater than atmospheric pressure, establishing a rupture point at a predictable increment over the working pressure, the preferred embodiment of the invention is in connection with its use in the hydronic electric baseboard heater shown in FIG. 3. Such a heater, generally designated 10, normally installed in a horizontally elongated metal convection cabinet (not shown) including a lower air inlet and an upper air outlet, includes a large diameter horizontal reservoir tube 12 having a left end cap 13 in which a hairpin-shaped electrical resistance heater element 14, made of insulated resistance wire, is mounted at its terminal ends 15. Electrical current is supplied to the terminal ends 15 from a current supply source not shown.

At the right end of the reservoir tube 12 a reducer 17 couples it to an elongated horizontal water passage tube 18. At the upper wall of the reservoir tube 12 adjacent to its left end, a riser tube 20, preferably of the same diameter as the water passage tube 18, extends slightly upward and merges into a horizontal finned tube portion 21 extending to the right, to join a downward return tube 22 which merges into the water passage tube 18. Sheet metal fins 24 are brazed along substantially the entire length of the finned tube portion 21.

Extending upward from the return tube 22 to clear the fins 24, and then extending to the left for a short distance thereabove, is an expansion tube 26, which terminates in a vertical square cut end 27.

As is conventional, the heater 10 is filled with a liquid, usually water to which a quantity of anti-freeze solution is added, to a level slightly above that of the finned tube portion 21; a gas such as air fills the expansion tube 26.

The rupture disk, generally designated 30, which is the subject of the present invention, is sealed within the expansion tube end 27 to exert the pressure of the air on the water which circulates in the closed system. Energizing the heater element 14 causes an increase of the temperature of the water and of the air within the expansion tube 26. Their pressure will increase with the temperature, which is subject to the control of a room thermostat 28. In conventional hydronic heaters of the type described, the normal working pressure, that is the pressure in the expansion tube 26 when the heater 10 is working at its normal capacity, may be of the order of 100 pounds per square inch. Conventional electrical safety controls, not illustrated, may be utilized to prevent abnormal increases in pressure. In any event, the rupture disk 30 serves as an ultimate safety device, to rupture at a predictable increment of pressure over the working pressure, say an increment of 100 pounds per square inch. Thus the present rupture disk 30 is designed to rupture at a total pressure of 200 pounds per square inch.

The tubular elements of the heater assembly 10, including the expansion tube 26, are conventionally formed of copper tubing. Assuming that the expansion tube 26 has an outer diameter of approximately 1 inch, I find it suitable to form the rupture disk 30 of copper sheet metal approximately 0.010 inches thick. Referring to FIG. 2, the disk 30 as originally formed includes a substantially flat circular central portion 32 whose diameter may be approximately 0.05 inches, surrounded by an annular portion 33 which is rounded to a portion of a spherical arc. At the outer margin of the annular portion 33, the disk has a flange 34 of sufficient width for permanent sealed joining within the end 27 of the expansion tube 26, for example by means of the brazed cylindrical seam joint 35. The joint 35 is of the type comprising brazing and soldering, that is a seam of molten metal between the unmelted material of the expansion tube 26 and the flange 34; the term includes such variations as soft soldering, silver soldering or brazing, and copper brazing.

The spherical arc to which the annular portion 33 is formed corresponds substantially to that to which the disk 30 would bulge under the normal working pressure of 100 pounds per square inch. The central portion 32 however is formed flat, as seen in FIG. 2, and cross scored with score lines 37. Using copper sheet metal of 0.010 inches thickness, the effect of forming the score lines 37, preferably using the coining process, is to reduce the metal thickness locally to preferably 0.0025 inches, and in any event within the range of 20 to 35 percent of its original thickness. It is convenient to form the score lines 37 on the inner side of the disk 30, that is, the side subject to inner pressures.

The work hardened material at the score lines of the domed replaceable rupture disks shown in the United States patents referred to in the first part of the specification can be relied upon to rupture at a predetermined increment in pressure. However when the heat-formed joint 35, or any other joint of the type comprising brazing and soldering, is made, the heat conductive copper sheet metal is annealed, relieving its work hardening and rendering it again ductile and its bursting pressure relatively unpredictable.

In the present invention however the disk 30 will function reliably to rupture at a predetermined increment over the normal working pressure, for example at a total pressure of 200 pounds per square inch where the working pressure is 100 pounds per square inch. I have discovered that by leaving the central portion 32 flat, although the annular portion 33 which surrounds it is rounded, the effect of bringing the heater 10 up to working pressure is to bulge the previously flat center portion 32 to the rounded configuration shown by dashed lines in FIG. 2. This bulging under the working pressure appears to cause strain hardening of the metal at the score lines 37. In normal operation, under the control of the thermostat 28 the temperature of the water in the heater 10 will rise and fall, and the air in the expansion tube 26 will increase its pressure to the normal working pressure off 100 p.s.i. and then diminish. Work hardening the material at the score lines 37 would then change the metal from ductile to relatively brittle.

If, after being subjected to such work hardening under normal operating pressures for even a short period of operation, abnormal conditions should cause an increase in water temperature and accompanying increase of pressure within the expansion tube 26 to 200 pounds per square inch, the material at the score lines 37 will fracture as shown in the phantom lines of FIG. 2, as the annular portion 33 of the disk bulges outward only slightly more. By a conventional coining process, the thickness of material left at the score lines 37 may be controlled to precise tolerances. Using only such conventional thickness controls, it has been found that by using a disk 30 proportioned to withstand normal operating pressure of 100 pounds per square inch and fracturing at 200 pounds per square inch, rupture of the type shown in FIG. 2 will occur reliably with tolerances of as little as 5 pounds per square inch. This predictable increment of pressure at rupture results from utilizing the working pressure to bulge the central portion 32 out of flatness and thus overcoming the annealing of material at the score lines 37.

Accordingly, by leaving the scored central portion 32 flat until after the brazing operation which serves to anneal the disk 30, and by using the normal working pressure to bulge it to roundness as shown in the dashed lines of FIG. 2, the present permanently installed rupture disk assembly works with reliability at least as great as that of prior replaceable domed rupture disks.

I claim:

1. For installing by means of a heat-formed sealed joint within a tubular part of a fluid system designed for operation at a normal working pressure greater than atmospheric pressure,
    a permanently installable rupture disk assembly, comprising
    a member formed of ductile heat-conductive sheet metal and having
    a substantially flat circular central portion and an annular portion surrounding the central portion,
    said annular portion being rounded to and terminating in a flanged edge, whereby such a heat-formed sealed joint may be made between said flanged edge and such tubular part, thus to present the working pressure of such system against the inner surface of said rounded annular portion, and
    score lines intersecting at the center of the substantially flat central portion,
    the sheet metal being of such thickness as will result in rounding of the substantially flat central portion under such normal working pressure of the system,
    the score lines being formed therein to such thinness as to work harden under extension attending to such rounding,
    whereby rounding at such normal working pressure work hardens the material at the score lines, and a predictable increment of pressure over such normal working pressure will cause rupture of the material at the score lines.

2. A permanently installed rupture disk assembly as defined in claim 1, wherein
    the ductile heat-conductive metal is copper, and
    the sealed joint is a joint of the type comprising brazing and soldering.

3. A permanently installed rupture disk assembly as defined in claim 2, wherein
    the normal working pressure of the system is of the order of 100 pounds per square inch, and
    the thickness of the copper sheet metal is approximately 0.010 inches, and
    the score lines are formed to a thickness of approximately 0.0025 inches.

4. A permanently installed rupture disk assembly as defined in claim 2, wherein
    the thickness to which the score lines are formed is in the range from one-fifth to one-third of the thickness of the sheet metal.

5. A permanently installed rupture disk assembly as defined in claim 3, wherein
    the diameter of the member, measured to its flange, is between 0.750 inches and 1.000 inches, and
    the diameter of the substantially flat central portion is between 0.400 inches and 0.600 inches.

* * * * *